United States Patent [19]

Krumin et al.

[11] Patent Number: 4,534,063

[45] Date of Patent: Aug. 6, 1985

[54] PAGING RECEIVER AND SUPPORTING RECEPTACLE THEREFOR

[75] Inventors: Donald K. Krumin, Ft. Lauderdale, Fla.; Orville W. Larson, Carmell, Calif.

[73] Assignee: Motorola, Inc., Schaumburg, Ill.

[21] Appl. No.: 452,249

[22] Filed: Dec. 22, 1982

[51] Int. Cl.[3] .......................... H04B 1/08; A45F 5/02; A45C 11/00

[52] U.S. Cl. .................................... 455/344; 455/351; 455/348; 224/162; 224/196; 224/199

[58] Field of Search ..................... 455/89, 90, 95, 100, 455/128, 347, 348, 351, 344; 224/163, 196, 197, 199, 224, 252, 269; 340/311.1, 825.44

[56] References Cited

U.S. PATENT DOCUMENTS

| | | | |
|---|---|---|---|
| 868,941 | 10/1907 | Redfern . | |
| 1,623,994 | 4/1927 | Buchsbaum et al. . | |
| 2,182,194 | 12/1939 | Blau . | |
| 2,509,428 | 5/1950 | Greene | 224/252 |
| 2,548,201 | 4/1951 | Cromley . | |
| 3,482,748 | 12/1969 | Roberts, Jr. | 455/351 |
| 3,631,994 | 1/1972 | Mackzum, Jr. . | |
| 3,743,147 | 7/1973 | Wilczynski . | |
| 3,878,589 | 4/1975 | Schaefer | 224/269 |
| 3,956,701 | 5/1976 | James, Jr. et al. . | |
| 3,976,995 | 8/1976 | Sebestyen | 455/351 |
| 4,073,416 | 2/1978 | McComber | 224/197 |
| 4,083,481 | 4/1978 | Selinko . | |
| 4,113,157 | 9/1978 | Woodbury | 224/163 |
| 4,313,119 | 1/1982 | Garay et al. . | |

*Primary Examiner*—Jin F. Ng
*Attorney, Agent, or Firm*—Joseph T. Downey; James W. Gillman; Edward M. Roney

[57] ABSTRACT

A paging device and supporting receptacle are provided for detachably securing the device to an article of clothing and providing for limited pivotal movement of the device to permit visual observation of a display portion of the device without completely removing the device from the receptacle.

12 Claims, 4 Drawing Figures

PAGING RECEIVER AND SUPPORTING RECEPTACLE THEREFOR

BACKGROUND OF THE INVENTION

The present invention relates generally to selective call radio alerting devices, as for example to paging receivers of the kind which can be carried on the person of a user.

There has been a substantial demand for personal radio receivers or pagers so that the user can receive a message at any time, thereby establishing a continuous communication link with some other person or station. These pager devices generally include a carrying case containing a radio receiver of appropriate design, with a battery power supply, an antenna and a signalling means. The case usually has some form of fastening means for attaching it securely, preferably to an article of clothing worn by the user. Such pagers normally are small enough to be clipped to such clothing as, for example, the belt.

It is desirable that the pager be easily and quickly detachable from the belt or other article of clothing and that it can be worn comfortably thereon. Heretofore, the fastening means has been attached in a fixed relation to the pager case with the result that the orientation of the case relative to the body of a user has been fixed by the orientation of the fastening means on the article of clothing of the user.

With the advent of display pagers, the orientation of the information display, in addition to the orientation of the pager case, is of great concern to the user, as is the location of the control switches for responding to or otherwise modifying the operation of the pager. When the pagere is to be used or a display is to be observed, the user frequently must remove the pager from its fastening means or supporting receptacle. It would be desirable to have a supporting receptacle wherein the paging device not only is detachably secured thereto for convenient attachment and removal, but a combination wherein the paging device can be adjusted to a position of easy visual observation and control activation without completely removing the paging device from the receptacle.

The present invention is directed to providing a new and improved paging receiver and supporting receptacle which satisfies this need.

SUMMARY OF THE INVENTION

An object of the present invention is to provide a personal paging receiver and supporting receptacle for detachably securing the paging device to an article of clothing and providing for flip-down movement thereof to permit visual observation of a display portion of the paging receiver.

Another object of the invention is to provide a supporting receptacle which is easily fabricated of a unitary one-piece structure while providing the above-mentioned features.

In the exemplary embodiment of the invention, a personal paging receiver is provided of the type intended to be carried on a person. A receptacle is adapted to be secured preferably to the belt of the person. complementary interengaging means are provided between the receptacle and the paging device for detachably securing the paging device to the receptacle. The complementary interengaging means include means providing for outward pivotal movement of the paging device relative to the receptacle in limited pivotal manner to permit visual observation of a rear display portion of the paging device without removing the device from the receptacle.

As disclosed herein, the receptacle is fabricated as an integrally molded one-piece structure having a pair of spaced, generally vertically extending side walls and an integral back wall. A pair of upper and lower detents are formed on the inside of each side wall. The paging device is sized to be received between the side walls of the receptacle and has a pair of upper and lower spring loaded protuberances on opposite ends of the case thereof. The mating upper and lower detents on the inside of the side walls of the receptacle with the protuberances on the ends of the case of the pager device provide the spring catch means for detachably securing the device in the receptacle. The lower spring catch defines a pivot axis for the paging device to permit outward pivotal movement of the pager relative to the receptacle in a flip-down manner to permit visual observation of a rear display portion of the pager without fully removing the device from the receptacle.

Other features include the provision of stop limit means on the back wall of the receptacle engageable by the paging device on relative pivotal movement thereof to define a positive limit position of the pager. The back wall of the receptacle is further relieved to permit ingress of a user's fingers to facilitate pivoting the paging device. The receptacle also includes means for readily releasably attaching the receptable to the user's clothing such as the belt without removing the belt.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
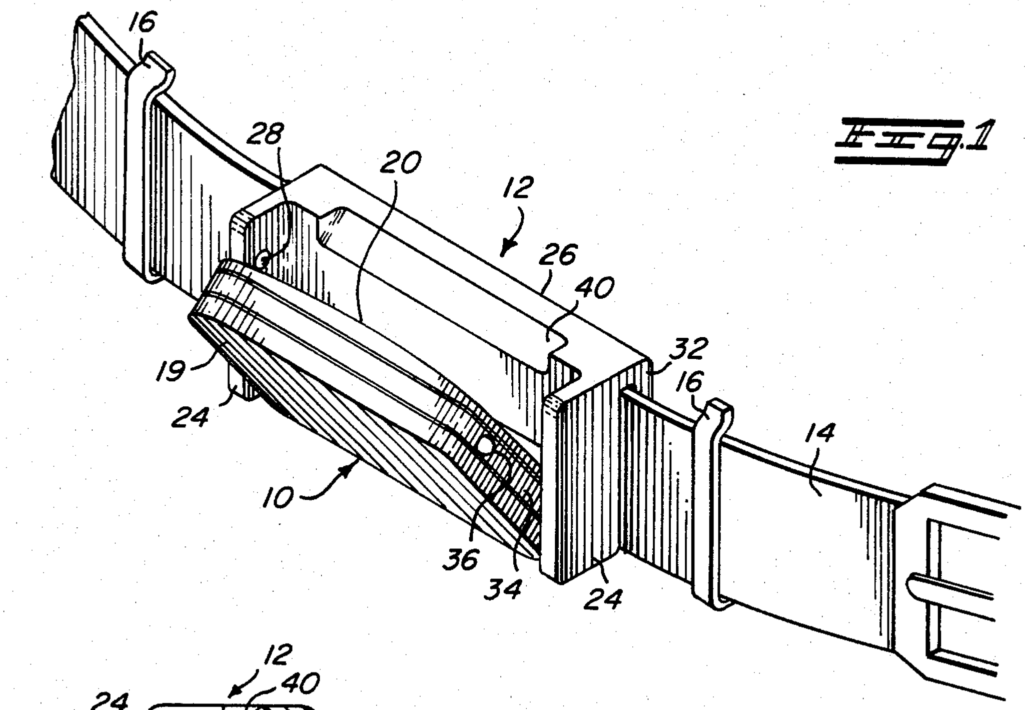
FIG. 1 is a perspective view of the paging receiver and supporting receptacle therefor mounted on a user's belt.

Referring to the drawings and specifically to FIG. 1, the combination of the present invention includes a pager, generally designated 10, and a supporting receptacle, generally designated 12. Receptacle 12 functions to detachably secure receiver 10 to a belt 14 so that the pager can be carried on the person of a user. The belt 14 is shown threaded through loops 16 of a user's trousers, and pager 10 in receptacle 12 is shown disposed between a pair of such loops. Pager 10 is oriented in an intermediate pivotal position relative to receptacle 12 to enhance the showing of the feature of allowing easy visual observation of a rear display portion. This orientation also shows the relative locations of some of the important details of both pager 10 and receptacle 12. In normal operation, pager 10 wil be vertically oriented in receptacle 12 which functions to securely attach the pager to the user's belt.

Paging devices generally comprise a case 18 containing a selective call radio receiver of appropriate design, with a power supply, an antenna and a signalling means. The selective call radio circuitry, power supply, antenna and signalling means are not shown herein, as they are well known in the art. In the specification and claims herein, the terms "upper", "lower", "horizontal", "front", "rear", etc. are used in relation to the disposition of the pager device and supporting receptacle as oriented in a vertical position as discussed for FIG. 1.

Figure 2:
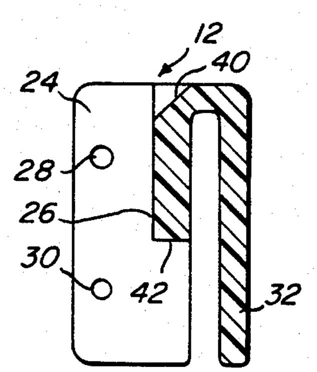
FIG. 2 is a vertical central sectional view through the supporting receptacle.

Referring to FIG. 2 in conjunction with FIG. 1, supporting receptacle 12 is preferably fabricated as an integral one-piece structure such as of molded plastic or the like. The receptacle 12 includes a pair of spaced, generally parallel side walls 24 joined and supported by a back wall 26. Each side wall also has a pair of upper and lower detents 28 and 30, respectively located on the inside surfaces thereof. The upper and lower detents on each side wall are generally vertically aligned, and the detents 28 on opposite side walls as well as detents 30 on opposite side walls are mutually, generally horizontally aligned. An L-shaped flange 32 is formed integrally with and is disposed behind back wall 26 for readily releasably attaching the receptacle to belt 14, or other article of clothing without completely opening the belt. In order to facilitate pivotal movement of the paging receiver, back wall 26 is provided with a relieved portion 40 along the top outer edge thereof to permit ingress of a user's fingers behind the paging device to facilitate pivoting the paging device outwardly. The limited pivotal position of the pager will be described in detail later.

Figure 3:
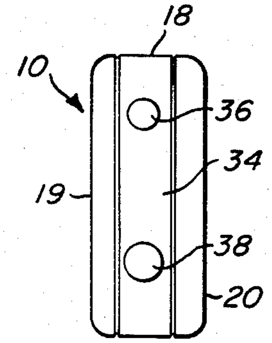
FIG. 3 is an end elevational view of the paging receiver.
Figure 4:
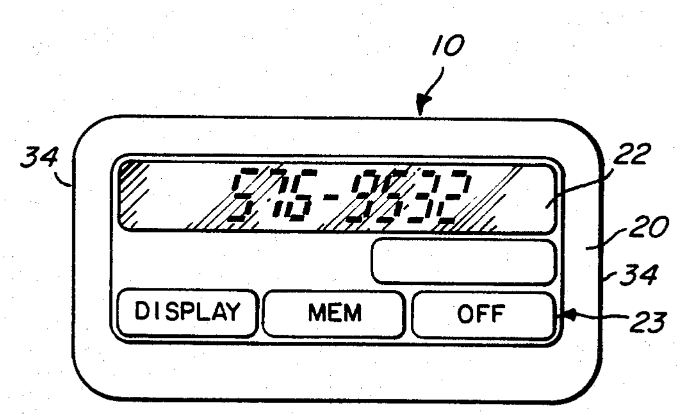
FIG. 4 is a rear elevational view of the control and display face of the paging receiver.

Referring to FIGS. 3 and 4 in conjunction with FIG. 1, case 18 enclosing pager 10 is generally rectangularly shaped and defines a pair of opposite end walls 34 as shown. The paging device 10 is sized to be receivable between side walls 24 of receptacle 12 with the end walls 34 of the paging device substantially flush with the receptacle side walls 24 and the rear face 20 of the paging device substantially flush with rear wall 26 of the receptacle. This provides a normal vertical orientation of pager 10 in receptacle 12.

The pager 10 has a front face 19 opposed to control and display face 20, as shown in FIG. 4. Front face 19 contains no control functions because of the possibility of damage or inadvertent activation. Display face 20 has LED displays 22, or the like, for visual observation of the received information by the user and control switches generally designated as 23.

Each end wall 34 of paging device 10 is provided with upper and lower proturberances 36 and 38 for mating with upper and lower detents 28 and 30, respectively, on the inside of receptacle side walls 24. The proturberances and detents comprise male and female members of a spring catch. The mating protuberances and detents operating between the paging device case 18 and the supporting receptacle 12 from complementary interengaging means for detechably securing the paging device to the receptacle. Moreover, the interengaging means are designed to provide outward pivotal movement of the paging device relative to the receptacle in a flip-down manner (as shown in FIG. 1) to permit visual observation of the rear display face 20 of the paging device and easy accessability to the control switches without removing the pager from the receptacle.

In its stored or verticle position, pager 10 is held completely within the receptacle by detents 28, 30 on receptacle 12 and protuberances 36, 38 on the pager case 10, whereby the rear display face 20 is protected by the inside or rear wall 26 of the receptacle. This also provides a means of keeping visual messages confidential to the user.

When a user receivers a signal, the paging device simply is pivoted downwardly as shown in FIG. 1, by releasing mating elements 28 and 36, while maintaining engagement of mating elements 30 and 38 to provide a pivot axis for the paging device relative to the receptacle. This may be easily accomplished by utilizing the fingers to press on the rear face 20 of the pager case 18 along relieved portion 40 of back wall 26. With sufficient pressure along the region of paper 10 accessible through relieved portion 40, the spring catch function of proturberances 36 mating with detents 28 can be overcome to allow pager to pivot downward while still entraped by receptacle 12. Thus, the user can visually observe the previously protected rear display face 20 of the paging device and actuate any of the several switches without completely removing the receiver from the receptacle. If desired, sufficient pressure from the user will overcome the spring catch formed by detents 30 and protuberances 38 to completely remove pager 10 from receptacle 12.

Another feature of the invention is the provision of stop limit means on receptacle 12 to define a positive limit pivotal position of the paging device. More particularly, as shown in FIG. 2, back wall 26 of receptacle 12 terminates at a lower shoulder 42 disposed generally intermediate detents 28, 30. As paging device 10 is pivoted downwardly about the spring catch formed by protuberances 38 and detents 30 (as shown in FIG. 1), rear face 20 of paging device 10 will abut shoulder 42 on the bottom of back wall 28 of the receptacle. The contact region of rear face 20 will be below switches 23 as shown in FIG. 4. The paging device therefore will be positively limited in its downward pivotal movement so that it cannot simply swing freely and hang below the receptacle. The entire visual display portion of pager 10 may then be observed by the user and switches 23 are easily accessible. This feature is also useful to free the user's hands for other purposes.

Thus it can be seen that the paging device and supporting receptacle of the present invention provide a simple combination whereby the receptacle detachably secures the paging device to a belt of a user and yet provides for a positive limit flip-down movement to permit visual observation of a rear display portion of the receiver without removing the receiver from the receptacle. In its stored position, the rear display of the receiver and its control switches are protected by the receptacle. Still, with all these novel features, the paging receiver can be readily removed from the receptacle and replaced therein when desired. The receptacle itself is readily detachable from a user's belt without completely opening the belt.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A receptacle and a paging receiver with an information display, comprising in combination:
means for securing said receptacle to a user's article of clothing;
said receptacle having sidewalls substantially perpendicular to a plane that is substantially tangential to said article of clothing at the securing point of said receptacle to said article of clothing;
breakaway hinging means for removably connecting said paging receiver to said receptacle and for permitting rotation of said paging receiver away from said tangent plane, said hinging means being located in part on said paging receiver and in part on said sidewalls; and
breakaway attaching means for removably connecting said paging receiver to said receptacle and for preventing said rotation, said attaching means being located in part on said paging receiver and in part on said sidewalls;
whereby breaking away said attaching means permits rotation of the paging receiver so that the user can observe the information displayed, and breaking away both said hinging means and said attaching means detaches the paging receiver from the receptacle.

2. The combination of claim 1, wherein:
said breakaway hinging means comprises a pair of opposed detents in said sidewall and a pair of mating protuberances on said paging receiver; and
said breakaway attaching means comprises at least detent in said sidewall and at least a mating protuberance on said paging receiver.

3. The combination of claim 2, wherein said protuberances comprise spring catch mechanisms.

4. The combination of claim 1, said receptacle further comprising a backwall, parallel to said tangent plane, having a means for ingress of a user's fingers to facilitate said rotation of said paging receiver.

5. The combination of claim 4, said paging receiver further comprising control switches controlling the operation of said paging receiver.

6. The combination of claim 1 said receptacle further comprising a means for limiting said rotation.

7. The combination of claim 6, said paging receiver further comprising control switches controlling the operation of said paging receiver.

8. A receptacle, adapted to receive a paging receiver with an information display, said paging receiver having a first and second mating means, said receptacle comprising:
means for securing said receptacle to a user's article of clothing;
said receptacle having sidewalls substantially perpendicular to a plane that is substantially tangential to said article of clothing at the securing point of said receptacle to said article of clothing;
first receiving means for receiving said first mating means, said first receiving means being located on said sidewalls, whereby the connection of said first mating means to said first receiving means forms a breakaway hinge that enables rotation of the paging receiver away from said tangent plane; and
second receiving means for receiving said second mating means, said second receiving means being located on one of said sidewalls, whereby the connection of said second mating means to said second receiving means forms a breakaway attachment that prevents said rotation;
whereby breaking away said attachment permits rotation of the paging receiver so that the user can observe the information displayed, and breaking away both said attachment and said hinge detaches the paging receiver from the receptacle.

9. A receptacle, adapted to receive a paging receiver with an information display, said paging receiver having a pair of opposed protuberances and at least a third protuberance, said receptacle comprising:
means for securing said receptacle to a user's article of clothing;
said receptacle having sidewalls substantially perpendicular to a plane that is substantially tangential to said article of clothing at the securing point of said receptacle to said article of clothing;
breakaway hinging means for removably grasping said pair of opposed protuberances and for permitting rotation of said paging receiver away from said tangent plane, said breakaway hinging means being located on said sidewalls; and
breakaway attaching means for removably grasping said third protuberance and for preventing said rotation, said breakaway attaching means being located on one of said sidewalls;
whereby breaking away said attaching means permits rotation of the paging receiver so that the user can observe the information displayed, and breaking away both said hinging means and said attaching means detaches the paging receiver from the receptacle.

10. The receptacle of claim 9, wherein:
said receptacle further comprises a pair of opposed sidewalls, perpendicular to said tangent plane;
said hinging means comprises a pair of opposed mating detents to receive said pair of opposed protuberances; and said attaching means comprises a third matching detent to receive said third protuberance.
said attaching means comprises a third mating detent to receive said third protuberance.

11. The receptacle of claim 9, said receptacle further comprising a backwall, parallel to said tangent plane, having a means for ingress of a user's fingers to facilitate said rotation of said paging receiver.

12. The receptacle of claim 9, said receptacle further comprising a means to limit said rotation.

* * * * *